United States Patent [19]

Endo

[11] Patent Number: 4,740,820

[45] Date of Patent: Apr. 26, 1988

[54] METHOD OF AND APPARATUS FOR PRODUCING HARD COPY OF COLOR PICTURE ADAPTIVE TO VARIATIONS IN CHARACTERISTICS OF FLUORESCENT SCREEN OF RECORDER CRT

[75] Inventor: Azuchi Endo, Kaisei, Japan

[73] Assignee: Fuji Photo Film Co., Ltd., Kanagawa, Japan

[21] Appl. No.: 911,383

[22] Filed: Sep. 25, 1986

[30] Foreign Application Priority Data

Sep. 27, 1985 [JP] Japan ................................ 60-212088

[51] Int. Cl.$^4$ ........................ G03B 27/72; G03B 27/80
[52] U.S. Cl. ........................................ 355/20; 354/76; 355/32; 355/77
[58] Field of Search ............................ 355/20, 32, 77; 358/332; 354/75, 76

[56] References Cited

U.S. PATENT DOCUMENTS 4,373,156 2/1983 Pfannkuch et al. ............. 358/332 X

Primary Examiner—Richard A. Wintercorn

Attorney, Agent, or Firm—Birch, Stewart, Kolasch & Birch

[57] ABSTRACT

An apparatus for producing a hard copy of a color picture includes a cathode ray tube for displaying a picture component on a screen thereof upon reception of a video signal which is associated with a separated-color component, and a recorder which includes a plurality of separated-color filters to expose a recording medium to the picture component being displayed on the screen through any of the filters. The recorder exposes the recording medium to picture components of individual separated colors by additive color photography to record a color picture. A photodetector is provided for measuring brightness of the screen through any one of the filters while a controller controls the cathode ray tube and the photodetector. The controller, before recording the picture components of the individual separated-color components on the recording medium, adjust at least one of luminance and contrast of the tube and an exposure time of the recording medium, based on the brightness measured.

5 Claims, 3 Drawing Sheets

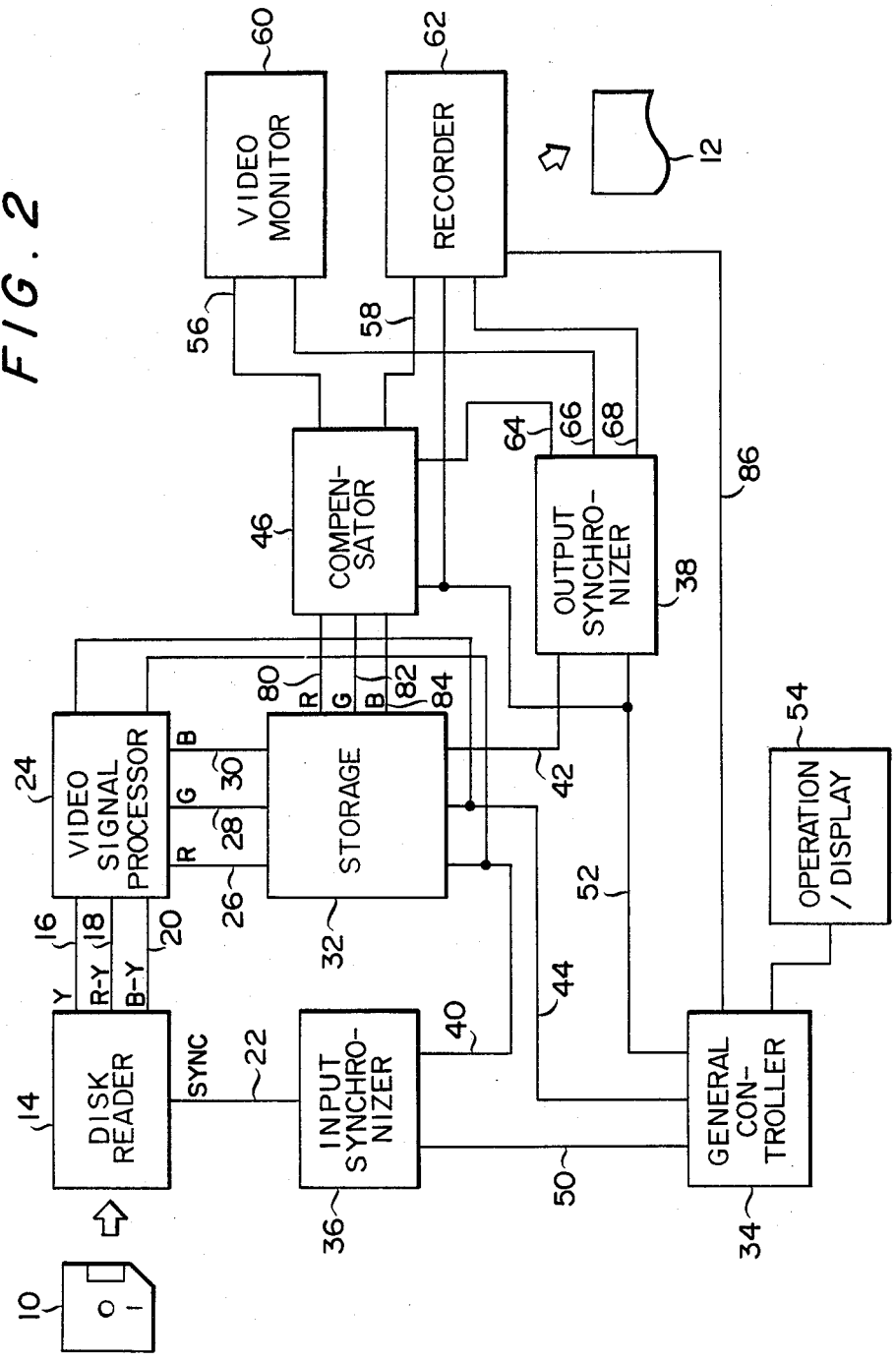

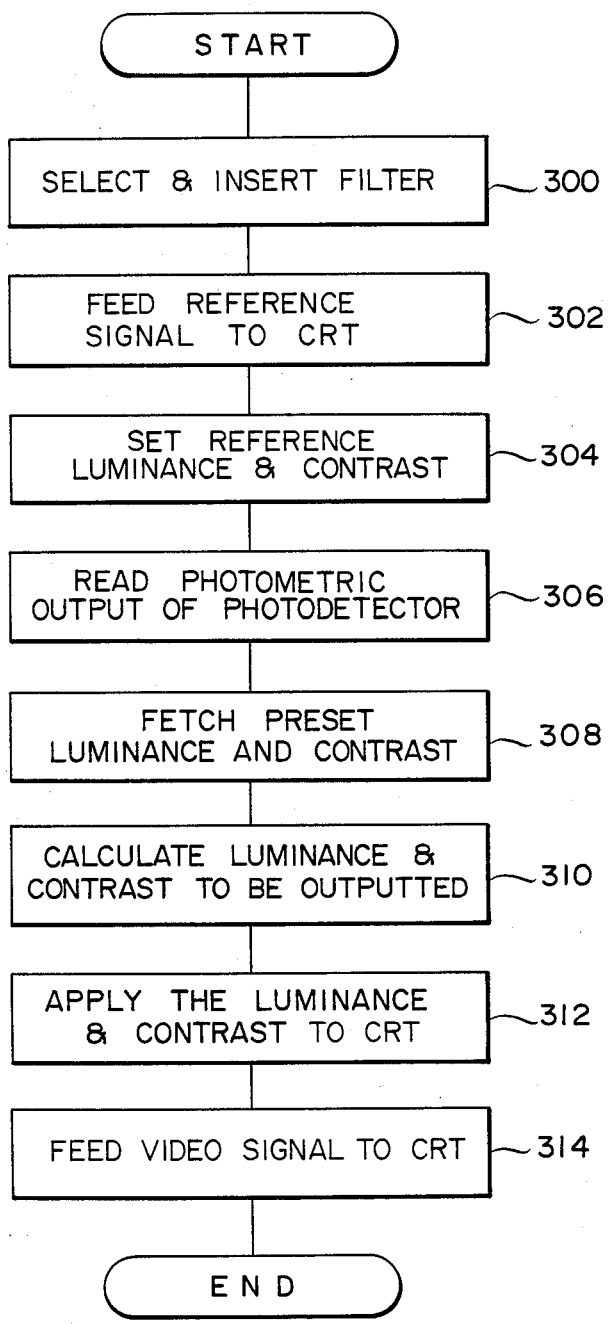

METHOD OF AND APPARATUS FOR PRODUCING HARD COPY OF COLOR PICTURE ADAPTIVE TO VARIATIONS IN CHARACTERISTICS OF FLUORESCENT SCREEN OF RECORDER CRT

BACKGROUND OF THE INVENTION

1. Field of the Invention

The present invention relates to a picture recording apparatus and, more particularly, to a method and apparatus for producing a hard copy of a color picture which is represented by video signals.

2. Description of the Prior Art

There has been known an electronic still camera system in which a picture is picked up by an electronic still camera or a television (TV) camera and then recorded on a video signal recording medium such as a magnetic video disk, or so-called video floppy, or a video tape. Meanwhile, there is an increasing demand for an apparatus capable of reproducing in the form of a hard copy a picture which is recorded on a video signal recording medium as mentioned, i.e., reproducing the picture as a visible one on a picture recording medium, such as a printing sheet of paper.

A recording apparatus with such a capability may be implemented with a system which displays a desired picture on a cathode ray tube (CRT) or any other picture display, then causes imaging optics to focus the picture being displayed onto a picture recording medium so as to expose the medium to the picture.

Where a color picture is to be recorded on a picture recording medium by reading video signals out of a video signal recording medium to display them on a CRT adapted for picture recording, a frame picture, or picture component, in each of three separated colors is formed and the resultant three picture components are superposed on each other in the same frame of the picture recording medium by additive color photography. For high quality reproduction of a picture, therefore, it is important that the three picture components are adequately balanced in color.

Recording schemes known in the art include one which uses a high luminance black-and-white CRT. In accordance with this particular scheme, pictures in three separate colors are selectively displayed on the screen of the CRT and passed through color filters which are respectively associated with the three separated colors, thereby exposing a picture recording medium. Specifically, such exposure is effected on the same frame of a picture recording medium for each of the three separated colors, whereby a color hard copy is produced by three-colors additive color photography.

To achieve a color hard copy with good color reproducibility by additive color photography as stated above, it is a prerequisite that the pictures in three separated-color components be focused onto a picture recording medium in an intended balance. This prerequisite cannot be met unless a picture capable of establishing an adequate relative color balance between the pictures of the three color components is produced on the screen of the CRT.

Generally, the screen of a black-and-white CRT is coated with a mixture of fluorescent substances having radiation characteristics which individually center around light components having particular wavelengths, e.g. red (R), green (G) and blue (B). Such substances provide the CRT with a flat radiation characteristic over the entire visible wavelength range. Usually, radiation characteristics of fluorescent substances are significantly temperature dependent and, moreover, the temperature characteristic in most cases differs from one emission wavelength range to another.

Assume that three separated-color picture components are sequentially reproduced on a screen, or a mixture of fluorescent substances having radiation characteristics which are different in temperature characteristic from each other, so as to combine the picture components by additive color photography on a picture recording medium through their associated color filters. Such undesirably brings about unbalance between the three separated colors. Specifically, when the radiation characteristic of a blue fluorescent substance, for example, has been deteriorated at a certain temperature, emission of the blue component is reduced. In this condition, should video signals representative of a B component be fed to the CRT to expose a picture recording medium to the blue picture component through a blue filter, a picture completed, or hard copy, would appear with a B component which is less than the other color components due to the short B luminance.

SUMMARY OF THE INVENTION

It is therefore an object of the present invention to provide a method and apparatus for producing a hard copy of a color picture which is capable of reproducing a color picture with high quality despite variations in the radiation characteristics of fluorescent substances which are provided on a CRT.

In accordance with one aspect of the present invention, there is provided an apparatus for producing a hard copy of a color picture having a CRT for displaying a picture component on a screen thereof upon reception of a video signal which is associated with a separated color component, and a recording section which includes a plurality of separated-color filters to expose a recording medium to the picture component being displayed on the screen through any of the filters. The recording section, or recorder, exposes the recording medium to picture components of individual separated colors by additive color photography to record a color picture. A photodetector is provided for measuring brightness of the screen through any of the filters while a controller controls the CRT and the photodetector. The controller, before recording the picture components of the individual separated-color components in the recording medium, adjusts at least one of luminance and contrast of the CRT and an exposure time of the recording medium, based on the brightness measured.

In accordance with another aspect of the present invention, there is provided a method of producing a hard copy of a color picture comprising the steps of producing a picture on a screen of a CRT upon reception of a video signal which is associated with a separated-color component, and exposing a recording medium to the picture component being dispalyed on the screen through any of a plurality of separated-color filters, whereby the recording medium is exposed to picture components of individual separated-color components by additive color photography to record a color picture on the recording medium. Before recording the picture components of the individual separated-color components on the recording medium, any one of the plurality of filters is selected. Then, a reference signal is applied to the CRT while brightness of a pattern being represented on the screen by the reference signal is measured through the selected filter. The brightness measured and at least one of preset values of luminance and contrast of the CRT is subjected to a mathematical operation to adjust at least associated one of the luminance and contrast of the CRT.

BRIEF DESCRIPTION OF THE DRAWINGS

The above and other objects, features and advantages of the present invention will become more apparent from the following detailed description taken with accompanying drawings in which:

FIG. 2 is a schematic block diagram of an apparatus for producing a hard copy of a picture embodying the present invention; and FIG. 3 is a flowchart demonstrating a specific example of operations of the general control section as shown in FIG. 1 which is related to the present invention.

DESCRIPTION OF THE PREFERRED EMBODIMENT

Figure 1:
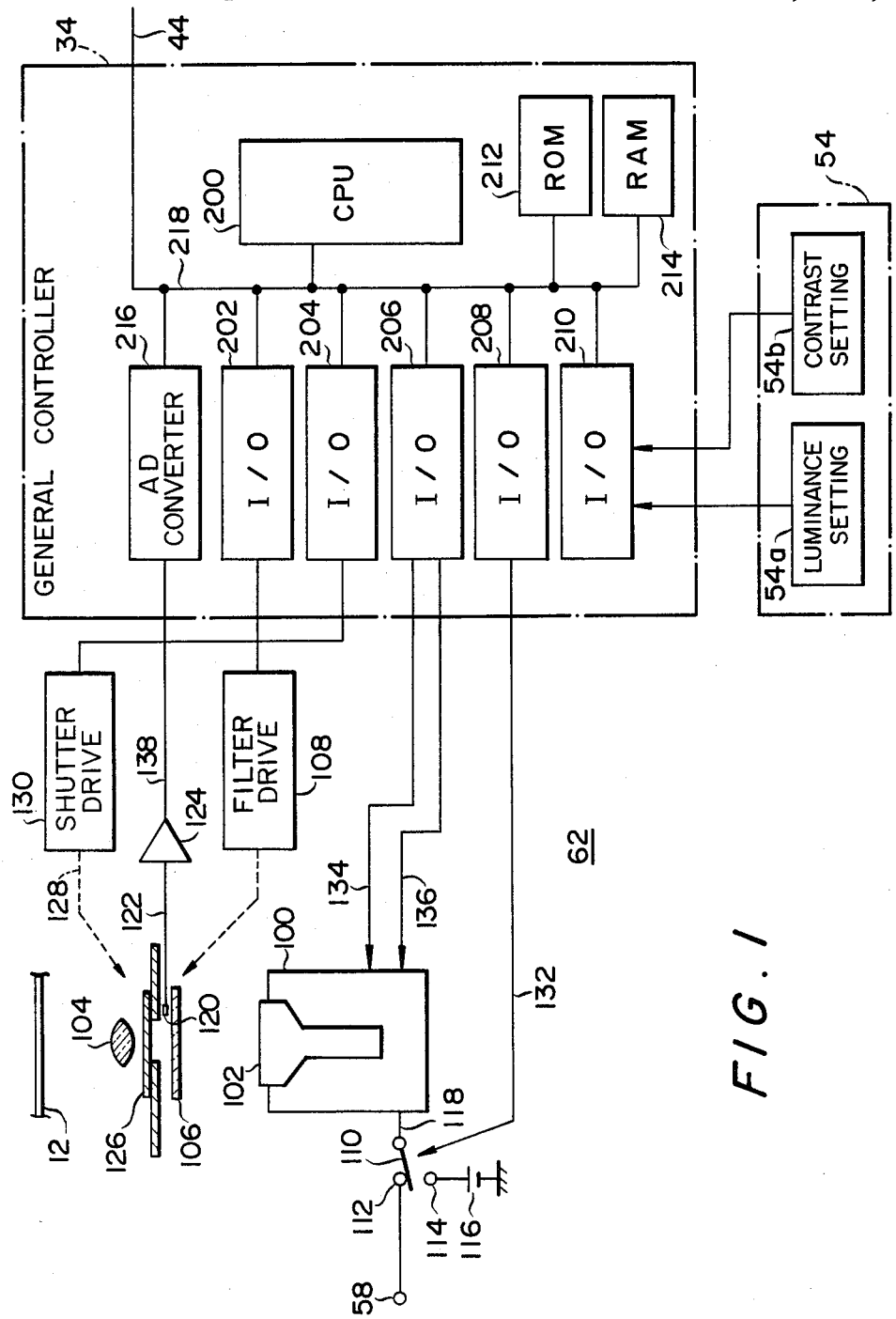
FIG. 1 is a functional block diagram representative of a recording system and a general control section which are included in a preferred embodiment of the present invention as shown in FIG. 2.

Referring to FIG. 2 of the drawings, in a particular embodiment of the present invention, pictures picked up by an electronic still camera or like imaging apparatus are stored in a magnetic video disk, or so-called video floppy, 10 in a format of field video signals or frame video signals. The video signals representative of any desired picture are read out of the disk 10 to be reproduced in the form of a hard copy on a picture recording medium 12, e.g. color printing paper.

In the illustrative embodiment, video signals are stored in the disk 10 one field per track. The video signals are implemented with chrominance line-sequential signals and may consist of luminance signals and chrominance signals which are recorded on tracks after being subjected to, for example, frequency modulation. These signals may either be so-called field video signals one field of which constitutes one frame or so-called frame video signals two fields of which constitute one frame. In the case of frame video signals, their existence in the disk 10 is indicated by a data signal which is superposed on the video signals. Advantageously, the data signal is multiplexed on the video signals in a differential phase shift keying (DPSK) format.

Advantageously applicable to the video signals stored in the disk 10 are the signal standards assigned to video floppies which are presently on the market, i.e. those assigned to a magnetic disk format for an electronic camera.

The apparatus includes a magnetic disk reading section, or disk reader, 14 which serves as a video signal input unit. The disk reader 14 reads video signals out of the disk 10, demodulates them, and then separates them into a luminance signal Y and chrominance signals R-Y and B-Y, and synchronizing (SYNC) signals. The signals Y, R-Y and B-Y are converted into digital signals and fed to a video signal processor 24 over lines 16, 18 and 20, respectively. The signals SYNC are applied to an input synchronizing section, or input synchronizer, 36 over a line 22. The chrominance signals may be in a line-sequential format. If desired, a magnetic tape reader, a receiver interconnected to a communication link and other video signal input terminals may be installed in place of or in addition to the disk reader 14.

The video signal processor 24 performs a predetermined arithmetic operation on the luminance signal Y and the chrominance signals R-Y and B-Y to prepare three separated color signals, while subjecting the color signals to color emphasis processing, sharpness processing and other various kinds of necessary video signal processing. The three separated color signals R, G and B produced by the processor 24 are routed to a storage 32 over lines 26, 28 and 30, respectively.

The storage 32 comprises a frame memory made up of a pair of memory units which are each implemented with a random access memory (RAM). A write clock and a read clock are selectively fed to the storage 32 from a general controller 34. Video signal data are written into one of the two memory units at a time.

The addresses of the storage locations of the storage 32 are controlled by the input synchronizer 36 over a control line 40 and by an output synchronizing section, or output synchronizer, 38 over a control line 42. A memory control signal adapted for read/write control and others is fed from the general controller 34 to the storage 32 over a line 44. An address increment clock for the storage 32 is supplied from the input synchronizer during writing and from the output synchronizer 38 during reading, under the control of the controller 34.

The signals SYNC separated by the disk reader 14 are applied to the input synchronizer 36, as previously stated. The input synchronizer 36 functions to control synchronization of the readout system for reading video signals out of the disk 10 and includes a phase locked loop (PLL) which prepares a pixel clock PCLK, a horizontal synchronizing signal HSYNC, a vertical synchronizing signal VCYNC as well as other synchronizing signals. These synchronizing signals are fed from the output 40 of the synchronizer 36 to the video signal processor 24 and storage 32.

Video signal data R, G and B are selectively read out of the two memory units of the storage 32 under the control of the general controller 34, the data R, G and B being respectively applied to inputs 80, 82 and 84 of a compensator 46. The controller 34 controls the disk reader 14 and input synchronizer 36 over a control line 50 and the compensator 46 and output synchronizer 38 over a control line 52.

The compensator 46 performs various kinds of picture processing such as adjustment of color balance and white balance of a reproduced picture, adjustment of tone and density in compliance with a particular negative photosensitive characteristic and tone of a printing paper, or medium 12, and negative-to-positive (N/P) inversion, and interpolation of scanning lines. Specifically, the general controller 34 decodes picture processing commands which may be entered on an operation and display section 54 and delivers to the control input 52 a control signal which includes picture processing conditions as specified by the commands, the video signal data R, G and B being subjected to the picture processing responsive to the control signal. The picture processing conditions may be selected on a picture frame basis by manipulation of the section 54.

The compensator 46 has two video signal outputs 56 and 58 which are respectively interconnected to a video monitor 60 and a recording section, or recorder, 62. Controlled by the general controller 34, the compensator 46 converts the processed video signal data into analog signals and selectively delivers them over the outputs 56 and 58. To reproduce a picture represented by video signals on the monitor 60, the video signals are read out of the storage 32 by an ordinary interlace scanning principle (525 scanning lines and 60-hertz field frequency) and then delivered to the output 56 after being subjected to necessary compensation such as tone correction. To reproduce it by the recorder 62, on the other hand, the video signals are read out of the storage 32 by a 1050 scanning lines, 30-hertz field frequency interlace scanning system, then subjected to tone correction, N/P inversion, scanning line interpolation and other various kinds of processing, and then fed to the output 58.

The monitor 60 may advantageously be implemented with an ordinary color CRT display. Three separated color video signal data read out of the storage 32 under the control of the controller 34 are processed by the compensator 46 and then supplied to the monitor 60 by two-field one-frame interlace scanning. As regards the signal rate, there may advantageously be used an ordinary TV signal rate as typified by 525 scanning lines, and an interlaced field of 1/60 second. A monitor which is compatible with such an ordinary color TV signal system is preferable from the viewpoint of apparatus construction and economy. Another advantage with a monitor of the kind mentioned is that a picture can be displayed in exactly the same manner as a picture reproducible on a commonplace monitor.

The recorder 62 includes a CRT 100 (see FIG. 1) which may advantageously be implemented with a high luminance black-and-white CRT. The three separated color signals processed by the compensator 46 are applied to the CRT on an interlace basis. In this particular embodiment, those video signals are in a 1050 scanning lines, 1/30 second field period interlace format. Alternatively, the video signals may be produced on a 525 scanning lines, 1/30 second frame period non-interlace basis without having scanning lines interpolated by the compensator 46.

The output duration of the respective separated color signals may be substantially one second per separated color screen. This outputting time depends upon the radiation characteristics of a fluorescent mixture which is provided on the CRT screen 102, photosenstivity characteristic of the recording medium 12, etc. The general controller 34 controls picture recording such that, for example, a video signal representative of an R-color picture component is read out of the storage 32 to be displayed on the CRT 100 for about 1 second, then a G-color picture component, and then a B-color picture component.

The synchronizing signal outputs 64, 66 and 68 of the output synchronizer 38 are interconnected to the compensator 46, monitor 60 and recorder 62, respectively. Although not shown in the drawings, the synchronizer 38 includes a self-driven reference oscillator adapted to generate various kinds of synchronizing signals such as synchronizing signals for controlling mainly the recording system of the apparatus and a pixel clock PCLK. The synchronizer 38 is controlled by the general controller 34 by way of the control line 52.

The general controller 34 functions to collectively govern the operations of the whole apparatus and may advantageously be implemented with a microprocessor or like processing unit. Interconnected to the controller 34, the operation and display section 54 includes an input device for allowing an operator to enter commands as exemplified by a keyboard, and a display unit for showing the operator various internal states of the apparatus as well as guidances.

As shown in FIG. 1, the recorder 62 includes an imaging lens arrangement as represented symbolically by a lens 104. The screen 102 of the CRT 100 is picked up by the lens 104 to be focused onto the photosensitive surface of the recording medium 12. Three color filters 106 are selectively brought to a predetermined position in front of the lens 104 by a filter drive mechanism 108, the filters 106 being associated one with each of three separated colors. Selection of the filters 106 and feed of the recording medium 12 are performed under the control of the general controller 34.

A photodetector 120 is situated behind the position at which the filters 106 may selectively be located and which does not interfere with the main optical axis of the imaging optics. An output 122 of the photodetector 120 is interconnected to an amplifier 124. Advantageously, the photodetector 120 is of the type using a photodiode or like photosensitive element which shows substantially uniform sensitivity over the whole radiation wavelength range of the screen 102. Located behind the photodetector 120 is an optical shutter 126 which is opened and closed by a shutter mechanism 130, as symbolically represented by a phantom line 128.

In FIG. 1, a part of the recorder 62 and general controller 34 of FIG. 2 to which the present invention especially pertains is schematically shown. The compensator 46 under the control of the controller 34 receives the three separated-color video signal data R, G and B, chooses one of them to convert it to a corresponding analog signal, and amplifies the analog signal to produce it on the output 58.

The output 58 is interconnected to one terminal 112 of a switch 110. A stator of the switch 110 is interconnected to a luminance modulation input 118 of the CRT 110, and the other terminal 114 to a reference signal source 116 which functions to supply a reference signal. The switch 110 is controlled by the general controller 34 over a control line 132 so that the video signal input 118 of the CRT 100 is selectively connected to the two terminals 112 and 114.

In this particular embodiment, the general controller 34 is made up of a central processing unit (CPU) 200, five input/output (I/O) ports 202, 204, 206, 208 and 210, a read-only memory (ROM) 212 for storing fixed data and programs, a random-access memory (RAM) 214 serving as a temporary storage, and an analog-to-digital (AD) converter 216, all of which are interconnected to a system bus 218 as illustrated.

As represented by a line 44, the CPU 200 of the controller 34 is interconnected to the storage 32 to subject video signal data stored therein to various kinds of video signal processing.

The I/O port 202 is interconnected to the filter drive mechanism 108 so that the CPU 200 is capable of controlling the movement of a selected one of the filters 106 into and out of the optical axis of the imaging system. The I/O port 204 is interconnected to the shutter drive mechanism 130 to allow the CPU 200 to open and close the shutter 126. The I/O port 206 is interconnected to a luminance control terminal 134 and a contrast control terminal 136 of the CRT 100 making it possible for the CPU 200 to control the luminance and contrast of the CPU 100. Further, the I/O port 208 is interconnected to the switch drive line 132 so that the CPU 200 is capable of opening and closing the switch 110.

The I/O port 210 is interconnected to the operation and display section 54. In this embodiment, desired values of luminance and contrast of the CRT 100 which are entered by manipulation of keys on the section 54 are applied to the I/O port 210.

The input 138 of the AD converter 216 is interconnected to an output of the amplifier 124. The AD converter 216 converts an output signal of the photodetector 120 to a corresponding digital value which is applied to the system bus 218. Control lines interconnected to the I/O ports 202, 204, 206 and 208 and AD converter 216 constitute a part of a control line 86 which interconnects the general controller 54 and the recorder 62.

Before recording each one frame of color picture in the recording medium 12, the general controller 34 performs an operation for adjusting the luminance and contrast of the CRT 100 as demonstrated by a flowchart in FIG. 3. Specifically, the operation begins with controlling the filter drive mechanism 108 via the I/O port 202 to bring one of the separated-color filters 106 into alignment with the optical axis of the imaging optics (300).

Next, the CPU 200 controls the switch 110 via the I/O port 208 to connect it to the terminal 114 (302). In this condition, a reference signal is fed from the reference signal source 116 to the video signal input 118 of the CRT 100. Then, the CPU 200 controls the luminance control input 134 and contrast control input 136 of the CRT 100 via the I/O port 206 to adjust the luminance and contrast of the CRT 100 to predetermined reference values (304). This causes a raster to be displayed on the screen 102 of the CRT 100 with the reference luminance and contrast.

The CPU 200 photometrically checks the reference raster by the photodetector 120 through the filter 106. Specifically, the CPU 200 reads an output level of the photodetector 120 through the AD converter 216 (306). The value read as stated is representative of brightness of the reference raster which is being displayed on the screen 102 and measured by the photodetector 120 through the filter 106, which has been selected at the step 300.

Subsequently, the CPU 100 fetches through the I/O port 210 the luminance (54a) and contrast (54b) values which have been preset on the operation and display section 54 (308) and then performs a predetermined arithmetic operation with those preset values and the data provided by the photodetector 120, thereby calculating luminance and contrast values to be outputted (310). Based on the calculated values, the CPU 100 adjusts the luminance and contrast of the CRT 100 (312) and, thereafter, controls the switch 110 via the I/O port 208 to connect the luminance input 118 of the CRT 100 to the input terminal 112 (314). As a result, a video signal representative of the color which has been selected at the step 300 is fed from the output 58 of the compensator 46.

The arithmetic operation at the step 310 is performed such that when the reference raster is displayed on the screen 102, the luminance level as measured by the photodetector 120 through any of the filters 106 gains a predetermined value. Consequently, photometric values associated with the three filters 106 which are sequentially inserted into the optical path become substantially equal to each other. For example, when the brightness of the reference raster as measured by the photodetector 120 is relatively low, the luminance and contrast are increased and, when the former is relatively high, the latter is decreased.

The above-described adjustment of CRT luminance and contrast is effected with each of the three filters 106. As a result, a picture having a color balance adequately adjusted with respect to the three separated colors can be recorded in the medium 12.

While in the example discussed above both the luminance and the contrast of the CRT 100 are adjusted based on photometric outputs of the photodetector 120, such is not limitative and, alternatively, the luminance or the contrast only may be adjusted.

Further, the exposure time of the recording medium 12 may be adjusted in addition to or in place of the luminance and contrast of the CRT 100. For the adjustment of the exposure time, the CPU 100 controls the shutter drive mechanism 130 via the I/O port 204 so as to vary the duration of an open state of the shutter 126 based on the values as calculated at the step 310. In the case where the system is not furnished with the optical shutter 126, the exposure time adjustment may be accomplished by adjusting the period of time during which the CPU 200 reads video signals out of the storage 32 to apply them to the video signal input 118 of the CRT 100. In that case, the exposure of the medium 12 may be adjusted such that when the brightness of the reference raster as measured by the photodetector 120 is relatively low, the exposure time is increased and, when the former is relatively high, the latter is decreased.

In the illustrative embodiment, video signals representative of a single picture are repeatedly read out of the disk 10 over each field period. The video signals read out by the disk reader 14 are demodulated by the disk reader 14, whereafter synchronizing signals SYNC are separated from luminance signals Y and chrominance signals R-Y and B-Y. The signals SYNC are applied to the input synchronizer 36, and the luminance signal Y and chrominance signals R-Y and B-Y to the video signal processor 24. In response, the video signal processor 24 produces three separated color signals while subjecting them to color emphasis processing and sharpness processing. The resultant signals R, G and B are stored in the storage 32.

Controlling the storage 32, compensator 46 and others of the apparatus, the general controller 34 reads video signals out of the disk 10 and sequentially writes them into the recording medium 12 in the form of a reproduced color picture. In more detail, video signals stored in one track of the disk 10 are read and demodulated by the disk reader 14 and, eventually, entered into the storage 46 in a form of three separated color signals. In this instance, the address of the storage 46 is incremented by an address increment clock which is produced by the input synchronizer 36.

As one frame of video signals are fully accommodated in one memory unit of the storage 32, they are sequentially loaded in the compensator 46 in a predetermined order. From the compensator 46 the video signals are applied as three separated color video signals to the monitor 60 on a 525 scanning lines, 60-hertz field frequency interlace basis or to the recorder 62 on a 1050 scanning lines, 30-hertz field frequency interlace basis.

The compensator 46 subjects the video signals to color and tone correction according to the then preset conditions, then converts them into analog signals, and then delivers the analog signals to the monitor 60 over the output 56. The analog signals are reproduced as a picture on the monitor 60.

In the above condition, the operator may manipulate the operation and display section 54 while watching the monitor 60 so as to enter picture processing commands for adjusting density, tone, color balance, white balance and other control parameters associated with picture processing. The commands are decoded by the general controller 34 and then applied to the compensator 46 over the control line 52. In response, the compensator 46 controls the parameters with the result that video signal data undergone adequate processing are applied to the output 58.

A record command meant for the recorder 62 is entered on the operation and display section 54. To output a picture to the recorder 62, the general controller 34 sets up a condition for incrementing the read address of the storage 32 by sequential scanning, i.e. non-interlace scanning. An address increment clock for incrementing the address so is supplied from the output synchronizer 38. Video signals are read out of one of the memory units which is not writing then. Such readout is sequentially repeated on each of the scanning lines with the result that video signals are read out by non-interlace scanning, two fields constituting one frame. These video signals, too, are applied to the compensator 46 to undergo color and tone correction, N/P inversion and concomitant tone correction, and interpolation of scanning lines. Consequently, the compensator 46 produces video signals on a 1050 scanning lines, 1/15 second frame period interlace basis, for example.

The non-interlace scanned video signals with an increased number of scanning lines are fed from the output 58 of the compensator 46 to the recorder 62. Before this, the general controller 34 has conditioned the recorder 62 to select one separated color, e.g. R-color. Under this condition, the R-color video signal out of all the video signals produced by the compensator 46 is applied to the recorder 62 to be displayed on the CRT screen 102. The controller 34 has fed the recording medium 12 beforehand and positioned its fresh photosensitive surface in a predetermined exposing station. Also, the controller 34 has brought one of the filters 106 into alignment with the optical axis of the imaging optics. Naturally, the selected filter is a match of the separated color video signal which is fed from the compensator 46 to the recorder 62. By such a procedure, a picture of one separated color is electrostatically formed as a latent image on the photosensitive surface of the recording medium 12.

The controller 34 repeats the procedure described so far without feeding the medium 12 so that the other color signals are applied to the recorder 62. As a result, the other two color video signals are sequentially supplied to the CRT 100. This causes component pictures represented by the respective color video signals to be picked up and recorded in the same frame of the medium 12 as the R color video signal. The medium 12 may be developed later to produce a single frame picture as a hard copy.

In the illustrative embodiment, the brightness of the CRT 102 is measured before each of the three separated-color pictures is recorded in the medium 12. Alternatively, an arrangement may be made such that the brightness is measured for each of the three color components while the general controller 34 corrects video signal data stored in the storage 32 referencing the results of measurement and, then, writes the corrected data again into the storage 32. In this alternative arrangement, the controller 34 will read the corrected video signal data out of the storage 32 to record their associated component pictures by the recorder 62.

Further, the measurement of brightness and/or the correction of video signals does not need to be effected for all the three separated-color components. For example, where the R-color fluorescent material on the CRT screen 102 is noticeably deteriorated, the measurement and/or the correction may be applied to R-color only. The photometric operation and adjustment of video signals may even be performed only when required or periodically, i.e., not every time a picture is recorded in the medium 12.

The apparatus of the present invention is effectively applicable not only to a CRT type picture recording system as described above but also to other picture recording systems such as a one which uses a fiber optic tube (FOT).

It will be seen from the foregoing that in accordance with the present invention brightness of the screen of a CRT adapted for recording is measured through separated-color filters and, based on the results of measurement, the luminance and contrast of the CRT and/or the exposure time of a picture recording medium is adjusted. This effectively compensates for disturbance to the color balance of a picture to be recorded in the medium due to variations in the radiation characteristics of a fluorescent coating on the CRT, thereby enhancing the quality of a picture which is reproduced as a hard copy.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. An apparatus for producing a hard copy of a color picture comprising:
   a cathode ray tube for displaying a picture component on a screen thereof upon reception of a video signal which is associated with a separated-color component;
   recorder means having a plurality of separated-color filters for exposing a recording medium to the picture component being displayed on the screen through any of the filters;
   said recorder means exposing the recording medium to picture components of individual separated-colors by additive color photography to record a color picture;
   photometric means for measuring brightness of the screen through any one of the filters; and
   control means for controlling said cathode ray tube, recorder means and photometric means;
   said control means, before recording the picture components of the individual separated-color components on the recording medium, adjusting at least one of luminance and contrast of said cathode ray tube and an exposure time of the recording medium, based on the brightness measured.

2. An apparatus in accordance with claim 1, wherein said recorder means comprises:
   reference signal generator means for generating a reference signal; and
   selector means for selectively supplying the video signals and the reference signal to said cathode ray tube;

said control means comprising input means for setting up at least one of values of the luminance and contrast of said cathode ray tube;

said control means, before recording the picture components of the individual separated-colors in the recording medium, controlling said selector means to feed the reference signal to said cathode ray tube, causing said photometric means to measure brightness of the screen resulting from the reference signal, and performing a mathematical operation with the brightness measured and the luminance and contrast of said cathode ray tube which are set up by said input means to adjust at least associated one of the luminance and contrast of said cathode ray tube.

3. An apparatus in accordance with claim 1, wherein the video signals are stored in a magnetic disk, further comprising means for reading the video siganls out of the magnetic disk to provide the video signals to said cathode ray tube.

4. A method of producing a hard copy of a color picture comprising the steps of:

producing a picture on a screen of a cathode ray tube upon reception of a video signal which is associated with a separated-color component; and exposing a recording medium to the picture component being displayed on the screen through any of a plurality of separated-color filters;

whereby the recording medium is exposed to picture components of individual separated-color components by additive color photography to record a color picture on the recording medium;

said method further comprising, before recording the picture components of the individual separated-color components on the recording medium, the steps of:

selecting any one of the plurality of filters and placing the selected filter in front of the screen;

applying a reference signal representative of an image to the cathode ray tube;

measuring brightness of the image displayed on the screen through the selected and placed filter; and subjecting the measured brightness to a mathematical operation with a value preset for at least one of luminance and contrast of the cathode ray tube to adjust at least an associated one of the luminance and contrast of the cathode ray tube.

5. An apparatus for producing a hard copy of a color picture comprising:

a cathode ray tube for receiving a video signal representing a picture component associated with a separated color and displaying the picture component on a screen thereof;

recorder means having a plurality of separated-color filters for exposing a recording medium to the picture component displayed on the screen through any of the filters;

filter selecting means for selecting one of the plurality of separated-color filters and placing the selected filter in front of the screen;

photometric means provided opposite to the screen with respect to the selected and placed filter for measuring brightness of the screen through the selected and placed filter;

control means for controlling said cathode ray tube, recorder means, filter selecting means and photometric means to cause said filter selecting means to select one of the plurality of separated-color filters which is associated with the picture component displayed on the screen, and to cause said recorder means to expose the recording medium to the displayed picture component through the selected and placed filter, thereby recording a color picture on the recording medium by additive color photography;

said control means, before recording a picture component of a separted-color on the recording medium, adjusting at least one of luminance and contrast of said cathode ray tube and an exposure time of the recording medium on the basis of the brightness measured.

* * * * *